US011440352B2

(12) United States Patent
Uchida (10) Patent No.: US 11,440,352 B2
(45) Date of Patent: Sep. 13, 2022

(54) PNEUMATIC TIRE (71) Applicant: The Yokohama Rubber Co., LTD., Tokyo (JP)

(72) Inventor: Yuta Uchida, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 490 days.

(21) Appl. No.: 16/470,168

(22) PCT Filed: Dec. 19, 2017

(86) PCT No.: PCT/JP2017/045477
§ 371 (c)(1),
(2) Date: Jun. 14, 2019

(87) PCT Pub. No.: WO2018/117083
PCT Pub. Date: Jun. 28, 2018

(65) Prior Publication Data
US 2020/0009917 A1 Jan. 9, 2020

(30) Foreign Application Priority Data
Dec. 20, 2016 (JP) .............................. JP2016-246148

(51) Int. Cl.
*B60C 11/03* (2006.01)
*B60C 11/13* (2006.01)
(Continued)

(52) U.S. Cl.
CPC .......... *B60C 11/0302* (2013.01); *B60C 11/13* (2013.01); *B60C 11/11* (2013.01);
(Continued)

(58) Field of Classification Search
CPC ..... B60C 11/03; B60C 11/0302; B60C 11/11; B60C 11/12; B60C 11/13; B60C 2011/0344; B60C 2011/0379
See application file for complete search history.

(56) References Cited

U.S. PATENT DOCUMENTS

D670,235 S * 11/2012 de Briey-Terlinden ..... D12/567
2007/0017618 A1 1/2007 Miyasaka et al.
(Continued)

FOREIGN PATENT DOCUMENTS

DE 199 00 266 10/2000
GB 489359 7/1938
(Continued)

OTHER PUBLICATIONS

International Search Report for International Application No. PCT/JP2017/045477 dated Apr. 3, 2018, 6 pages, Japan.

*Primary Examiner* — Katelyn W Smith
*Assistant Examiner* — Philip N Schwartz
(74) *Attorney, Agent, or Firm* — Thorpe North & Western (57) ABSTRACT

A pneumatic tire tread pattern includes a center main groove extending in a circumferential direction, first and second inclined lug grooves located on respective first and second sides in a lateral direction and extending from the center main groove toward the respective first and second sides in the lateral direction with respect to the circumferential direction, and inner branched lug grooves each branched from a middle of a corresponding one of the first and second inclined lug grooves, inclined identically to an inclination direction of the first and second inclined lug grooves, and connected to the center main groove. The first and second inclined lug grooves include a center portion extending outward from the center main groove in the lateral direction, an outer portion extending inward from a shoulder side in
(Continued)

the lateral direction, and a bent portion at which the center and outer portions are bent and connected together.

14 Claims, 6 Drawing Sheets

(51) Int. Cl.
  *B60C 11/11* (2006.01)
  *B60C 11/12* (2006.01)
(52) U.S. Cl.
  CPC ....... *B60C 11/12* (2013.01); *B60C 2011/0344* (2013.01); *B60C 2011/0379* (2013.01)

(56) References Cited

U.S. PATENT DOCUMENTS

| | | | |
|---|---|---|---|
| 2007/0131324 A1 | 6/2007 | Fujita | |
| 2008/0257467 A1 | 10/2008 | Kusano | |
| 2014/0020803 A1 | 1/2014 | Fujita | |
| 2014/0190607 A1* | 7/2014 | Matsunami | ........... B60C 11/032 |
| | | | 152/209.11 |

FOREIGN PATENT DOCUMENTS

| | | |
|---|---|---|
| JP | S63-013820 | 1/1988 |
| JP | S63-138203 | 9/1988 |
| JP | 2001-322406 | 11/2001 |
| JP | 2006-089004 | 4/2006 |
| JP | 2007-030558 | 2/2007 |
| JP | 2007-161114 | 6/2007 |
| WO | WO 2006/035666 | 4/2006 |
| WO | WO 2012/133559 | 10/2012 |

* cited by examiner

*(Prior Art)*

PNEUMATIC TIRE

TECHNICAL FIELD

The present technology relates to a pneumatic tire with a tread pattern.

BACKGROUND ART

All-season pneumatic tires (hereinafter referred to as all-season tires) are positioned as tires intermediate between regular, what is called summer tires used during non-snow seasons, and snow tires referred to as winter tires, and are widely used in North America and Europe. The all-season tire is demanded to be excellent in driving performance and braking and driving performance (snow performance) on snow-covered road surfaces and in driving performance on dry road surfaces and wet road surfaces (dry/wet performance). However, when grooves or sipes are formed to increase a groove area in order to improve the snow performance, block rigidity of block elements provided in a tread pattern disadvantageously decreases and the dry/wet performance decreases.

On the other hand, a pneumatic tire is known that is capable of simultaneously providing braking and driving performance both on wet road surfaces and on ice- and snow-covered road surfaces in a highly excellent and compatible manner (Japan Unexamined Patent Publication No. 2001-322406).

The pneumatic tire is a tire for which a rotation direction is designated and in which a road contact surface portion of a tread portion includes an arrangement of directional blocks defined and formed by one or more central circumferential main grooves, inclined main grooves extending from opposite end regions in a herringbone pattern, and inclined subsidiary grooves each branched from a corresponding one of the inclined main grooves in the vicinity of the corresponding end region. Each one of the inclined main grooves includes a main groove portion located inward of the opposite end regions and having an inclination angle of from 30 to 65 degrees with respect to a tire equatorial plane and a groove width larger than a groove width of each one of the inclined subsidiary grooves. The inclined main groove includes two or more groove edge step portions at one groove edge of the main groove portion located forward in a tire rotation direction. The groove width of the inclined main groove is increased at the groove edge step portions.

The above-described pneumatic tire is a winter pneumatic radial tire that provides improved braking and driving performance both on wet road surfaces and on ice- and snow-covered road surfaces. The pneumatic tire is not an all-season tire, and thus has a different target performance. Thus, in a case where the tread pattern of the pneumatic tire is applied to an all-season tire, wet performance including sufficient drainage properties is not necessarily provided. When the number of grooves is increased to improve the drainage properties, the number of edge components is increased to improve the snow performance. However, dry performance is degraded that corresponds to driving performance on dry road surfaces.

SUMMARY

The present technology provides a pneumatic tire with a tread pattern, the pneumatic tire being able to provide improved wet performance including drainage properties while at least maintaining the snow performance and the dry performance.

A first aspect of the present technology is a pneumatic tire with a tread pattern, and includes the following forms.

In other words, the pneumatic tire includes:

a center main groove provided on a tire equator line and extending in a tire circumferential direction, a first inclined lug groove group including a plurality of first inclined lug grooves provided at intervals in the tire circumferential direction, each one of the first inclined lug grooves being provided on a first side across the center main groove in a tire lateral direction and extending, at any position in a ground contact region of the tread portion, from the center main groove in an inclination direction inclined with respect to the tire circumferential direction and the tire lateral direction while facing outward on the first side in the tire lateral direction and also facing in a first direction of the tire circumferential direction, a second inclined lug groove group including a plurality of second inclined lug grooves provided at intervals in the tire circumferential direction, each one of the second inclined lug grooves being provided on a second side across the center main groove in the tire lateral direction and extending, at any position in the ground contact region of the tread portion, from the center main groove in an inclination direction inclined with respect to the tire circumferential direction and the tire lateral direction while facing outward on the second side in the tire lateral direction and also facing in a second direction of the tire circumferential direction, and an inner branched lug groove group including inner branched lug grooves each provided for a corresponding one of the first inclined lug grooves and the second inclined lug grooves, each one of the inner branched lug grooves being branched from a middle of one of the first inclined lug grooves and the second inclined lug grooves and extending inward in the tire lateral direction while being inclined, with respect to the tire circumferential direction and the tire lateral direction, in an inclination direction identical to an inclination direction of the first inclined lug grooves or the second inclined lug grooves, each one of the inner branched lug grooves being connected to the center main groove, wherein each one of the first inclined lug grooves and the second inclined lug grooves includes a center portion extending outward from the center main groove in the tire lateral direction in a linear or curved shape, an outer portion extending inward from a shoulder side of the tread portion in the tire lateral direction in a linear or curved shape, and a bent portion at which the center portion and the outer portion are bent and connected together.

Preferably, each one of the inner branched lug grooves is branched from the outer portion.

Preferably, each one of the inner branched lug grooves is parallel with the center portion or is smaller in inclination angle with respect to the tire lateral direction than the center portion.

Preferably, a position in the tire lateral direction of the bent portion is located at a distance, from the tire equator line, of from 8 to 23% of a length that is half a tire ground contact width of the tread pattern.

Preferably, the center portion is smaller in groove depth than the outer portion.

Preferably, the inner branched lug groove is smaller in groove depth than the outer portion.

Preferably, bent lug grooves are provided for the respective first inclined lug grooves and the respective second inclined lug grooves, and each one of the bent lug grooves extends outward from the bent portion of a corresponding one of the first inclined lug grooves and the second inclined lug grooves in the tire lateral direction and also extends in a second direction opposite to the first direction.

Preferably, each of the bent lug grooves provided for the respective first inclined lug grooves and the respective second inclined lug grooves further extends while intersecting with an adjacent first inclined lug groove or an adjacent second inclined lug groove adjacent to one of the first inclined lug grooves or one of the second inclined lug grooves in the second direction opposite to the first direction.

Preferably, a portion of each one of the bent lug grooves extending in the second direction from a point where each one of the bent lug grooves intersects with the adjacent first inclined lug groove or the adjacent second inclined lug groove is larger in groove depth than a portion of each one of the bent lug grooves extending from the bent portion to the point where each one of the bent lug grooves intersects with the adjacent first inclined lug groove or the adjacent second inclined lug groove.

Preferably, each one of the bent lug grooves is smaller in groove depth than the outer portion.

Preferably, outer branched lug grooves are each provided to extend outward from the outer portion of a corresponding one of the first inclined lug grooves and the second inclined lug grooves in the tire lateral direction and also to extend in the second direction opposite to the first direction, and each one of the outer branched lug grooves intersects with an adjacent first inclined lug groove or an adjacent second inclined lug groove adjacent to one of the first inclined lug grooves and the second inclined lug grooves in the second direction and further extends from the adjacent first inclined lug groove of the adjacent second inclined lug groove, and connects to a first inclined lug groove or a second inclined lug groove adjacent to the adjacent first inclined lug groove or the adjacent second inclined lug groove in the second direction.

Preferably, each one of the outer branched lug grooves is smaller in groove depth than the outer portion.

Preferably, a position in the tire circumferential direction of a connection point A1 between the center main groove and one of the inner branched lug grooves provided for each one of the first inclined lug grooves is located between a connection point B1 between each one of the first inclined lug grooves and the center main groove and a connection point C1 between the center main groove and a first inclined lug groove adjacent to each one of the first inclined lug grooves in the first direction, and a position in the tire circumferential direction of a connection point A2 between the center main groove and the inner branched lug groove provided for each one of the second inclined lug grooves is located between a connection point B2 between each one of the second inclined lug grooves and the center main groove and a connection point C2 between the center main groove and a second inclined lug groove adjacent to each one of the second inclined lug grooves in the first direction.

Preferably, a distance between the connection point A1 and the connection point B1 in the tire circumferential direction is from 20 to 55% of a distance between the connection point B1 and the connection point C1 in the tire circumferential direction, and a distance between the connection point A2 and the connection point B2 in the tire circumferential direction is from 20 to 55% of a distance between the connection point B2 and the connection point C2 in the tire circumferential direction.

Preferably, a position of the connection point A1 in the tire circumferential direction is closer to a position of the connection point B2 or the connection point C2 in the tire circumferential direction than to a position of the connection point A2 in the tire circumferential direction.

The above-described pneumatic tire is capable of improving wet performance including drainage properties while at least maintaining snow performance and dry performance.

DETAILED DESCRIPTION

A pneumatic tire according to embodiments of the present technology will be described below in detail with reference to the accompanying drawings.

The pneumatic tire of the present embodiment described below is, for example, applied to an all-season tire for a passenger vehicle, and may also be applied to an all-season tire for a small truck, or an all-season tire for a bus and a truck. The pneumatic tire of the present embodiment described below is an all-season tire for a passenger vehicle.

Herein, "tire lateral direction" is the direction parallel with the rotation axis of the pneumatic tire. "Outward in the tire lateral direction" is the direction in the tire lateral direction away from a tire equator line CL that represents the tire equatorial plane with respect to the position of comparison. "Inward in the tire lateral direction" is the direction in the tire lateral direction toward the tire equator line CL with respect to the position of comparison. "Tire circumferential direction" is the direction in which the pneumatic tire rotates about the rotation axis of the pneumatic tire. "Tire circumferential direction" includes two distinct directions: a first direction and a second direction. "Tire radial direction" is the direction orthogonal to the rotation axis of the pneumatic tire. "Outward in the tire radial direction" is the direction away from the rotation axis along the tire radial direction with respect to the position of comparison. "Inward in the tire radial direction" is the direction toward the rotation axis along the tire radial direction with respect to the position of comparison.

"Tire ground contact edge" as used herein refers to the maximum linear distance along the tire lateral direction between ground contact edges, in the tire lateral direction, of a tire ground contact region formed on a flat plate when the tire is mounted on a specified rim and inflated to a specified internal pressure, and is placed perpendicularly to the flat plate in a static state and subjected to a load corresponding to a specified load. "Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a passenger vehicle tire, the specified internal pressure is an air pressure of 180 kPa, and the specified load is 88% of the maximum load capacity.

Tire Structure

Figure 1:
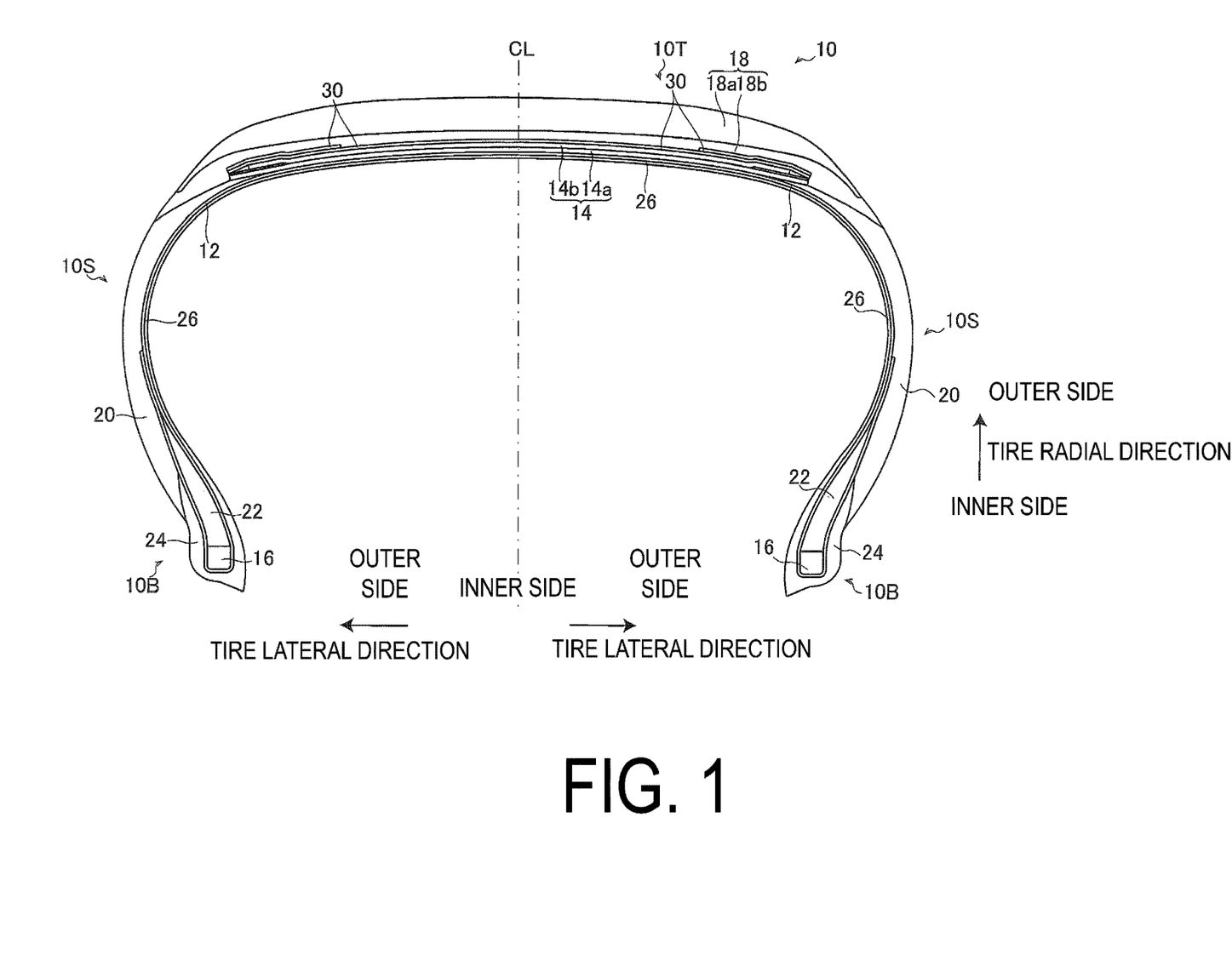
FIG. 1 is a profile cross-sectional view of an example of a tire of the present embodiment.

FIG. 1 illustrates a profile cross-sectional view of an example of a tire 10 of the present embodiment. The tire 10 includes a tread portion 10T including a tread pattern, a pair of bead portions 10B, and a pair of side portions 10S provided on both sides of the tread portion 10T, connecting the pair of bead portions 10B and the tread portion 10T.

The tire 10 mainly includes a carcass ply layer 12, a belt layer 14, and a bead core 16 as framework members or layers of framework members, and a tread rubber member 18, side rubber members 20, bead filler rubber members 22, rim cushion rubber members 24, and an innerliner rubber member 26 around the framework members or the layers of framework members.

The carcass ply layer 12 is constituted of a carcass ply member that is made of organic fibers covered with rubber and that is wound between a pair of annular bead cores 16 and formed into an annular shape. The carcass ply material is wound back at the bead cores 16 to extend outward in the tire radial direction. The belt layer 14 is provided outward of the carcass ply layer 12 in the tire radial direction, and is constituted of two belt members 14a, 14b. The belt layer 14 members are constituted of rubber-covered steel cords. The steel cords are disposed inclined at a predetermined angle of, for example, from 20 to 30 degrees with respect to the tire circumferential direction. A width in the tire lateral direction of the lower layer belt member 14a is larger than that of the upper layer belt member 14b. The steel cords of the two belt members 14a, 14b are inclined in opposite directions. As such, the belt members 14a, 14b are crossing layers serving to suppress expansion of the carcass ply layer 12 due to the pressure of the air in the tire.

The tread rubber member 18 is disposed outward of the belt layer 14 in the tire radial direction. The tread rubber member 18 has a multilayer structure of an upper tread rubber 18a and a lower tread rubber 18b. The side rubber members 20 are connected to both end portions of the tread rubber member 18 to form side portions 10S. The rim cushion rubber members 24 are provided at the inner ends of the side rubber members 20 in the tire radial direction and come into contact with a rim on which the tire 10 is mounted. The bead filler rubber members 22 are provided on the outer side of the bead cores 16 in the tire radial direction so as to be interposed between a portion of the carcass ply layer 12 prior to being wound around the bead cores 16 and a portion of the carcass ply layer 12 after being wound around the bead cores 16. The innerliner rubber member 26 is provided on the inner surface of the tire 10 facing a tire cavity region that is filled with air and is surrounded by the tire 10 and the rim.

Also, the tire 10 may include a bead reinforcing member between the carcass layer 12 wound around the bead core 16 and the bead filler rubber member 22. In addition, the tire 10 may include two belt cover layers 30 formed from organic fiber or steel cords covered with rubber, the belt cover layers 30 covering the belt layer 14 from the outer side in the tire radial direction of the belt layer 14. The tire structure of the present embodiment is as described above. However, the tire structure is not particularly limited, and a known tire structure is applicable. Note that illustration of grooves in a tread pattern described below is omitted from FIG. 1.

Tread Pattern

Figure 2:
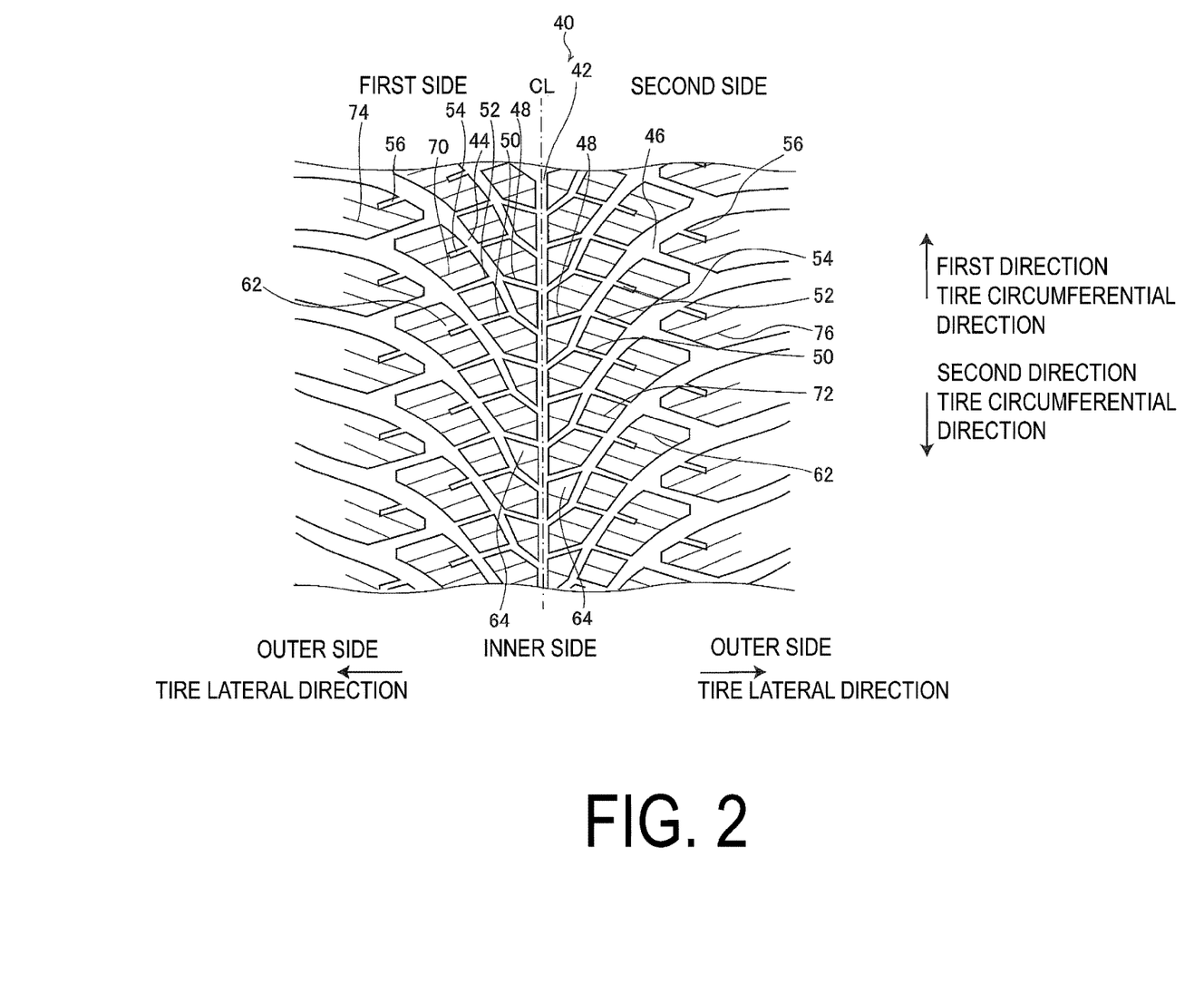
FIG. 2 is a diagram illustrating an example of a tread pattern of the tire of the present embodiment.

FIG. 2 is a diagram illustrating an example of a tread pattern provided in the tread portion 10T of the tire 10.

Note that the up/down direction of the sheet of FIG. 2 corresponds to the tire circumferential direction, and the left/right direction of the sheet of FIG. 2 corresponds to the tire lateral direction. In regard to the tire circumferential direction, the up direction of the sheet of FIG. 2 refers to a first direction, and the down direction of the sheet of FIG. 2 refers to a second direction. The tread portion 40 illustrated in FIG. 2 is a tread pattern for which the rotation direction is designated. The rotation direction is the second direction. Arrow information corresponding to a symbol provided on the side portion 10S of the tire 10 and representing the rotation direction indicates that the second direction is the rotation direction. In regard to the tire lateral direction, for both sides of the tire equator line CL in FIG. 2, the left side in the sheet of FIG. 2 refers to a first side, and the right side in the sheet of FIG. 2 refers to a second side.

The tread pattern 40 illustrated in FIG. 2 mainly includes a center main groove 42, first inclined lug grooves 44, second inclined lug grooves 46, inner branched lug grooves 48, bent lug grooves 50, and outer branched lug grooves 52.

The center main groove 42 is provided on the tire equator line CL and extends in the tire circumferential direction. The center main groove 42 may extend linearly in the tire circumferential direction as illustrated in FIG. 2 but may extend in a zigzag-manner. In a case of the center main groove 42 extending linearly in the tire circumferential direction, the tire equator line CL preferably passes through the center of the center main groove 42. However, the tire equator line CL may be offset from the center of groove width of the center main groove 42 so long as the tire equator line CL passes through the center main groove 42. The groove width of the center main groove 42 has a dimension equal to a range of from 2 to 10% of a length that is half the tire ground contact width.

Each one of the first inclined lug grooves 44 is provided on a first side on one side of the center main groove 42 in the tire lateral direction and extends from the center main groove 42 toward the first side in the tire lateral direction to a pattern end on the first side. The first inclined lug groove 44 extends, at any position in a tire ground contact region of the tread portion, from an inner side in the tire lateral direction, in an inclination direction inclined with respect to the tire circumferential direction and the tire lateral direction such that the first inclined lug groove faces outward on the first side in the tire lateral direction and also faces in the first direction of the tire circumferential direction.

A plurality of the first inclined lug grooves 44 are provided at intervals in the tire circumferential direction to form a first inclined lug groove group.

Each one of the second inclined lug grooves 46 is provided on a second side on one side of the center main groove 42 in the tire lateral direction and extends from the center main groove 42 toward the second side in the tire lateral direction to a pattern end on the second side. The second inclined lug groove 46 extends, at any position in the tire ground contact region of the tread portion, from the inner side in the tire lateral direction, in an inclination direction inclined with respect to the tire circumferential direction and the tire lateral direction such that the second inclined lug groove faces outward on the second side in the tire lateral direction and also faces in the first direction of the tire circumferential direction.

A plurality of the second inclined lug grooves 46 are provided at intervals in the tire circumferential direction to form a second inclined lug groove group.

Figure 3:
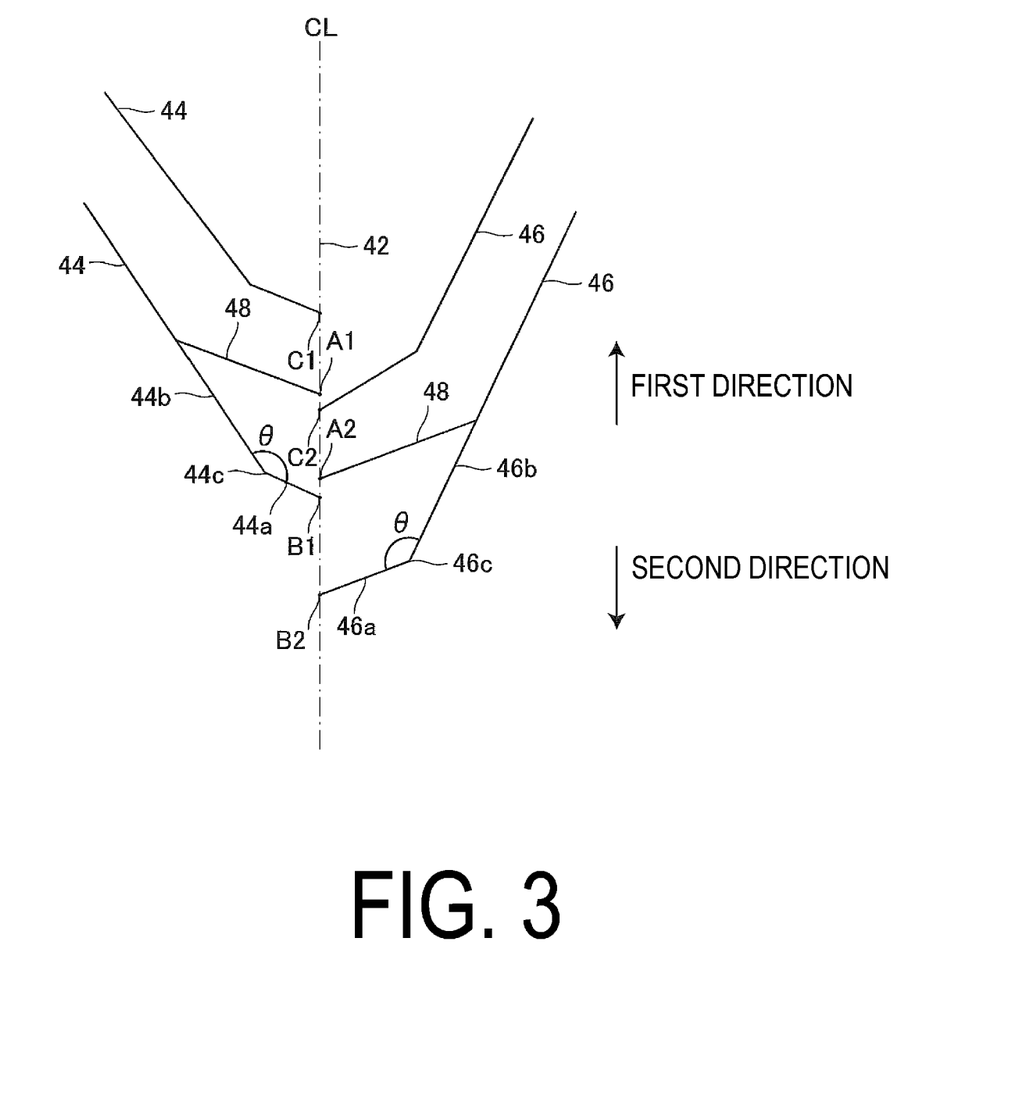
FIG. 3 is a schematic diagram schematically illustrating a configuration of first inclined lug grooves and second inclined lug grooves illustrated in FIG. 2.

FIG. 3 is a schematic diagram schematically illustrating a configuration of the first inclined lug grooves 44 and the second inclined lug grooves 46. In FIG. 3, the grooves are illustrated as straight lines for easy understanding.

As illustrated in FIG. 3, the first inclined lug groove 44 and the second inclined lug groove 46 respectively include center portions 44a, 46a, outer portions 44b, 46b, and bent portions 44c, 46c.

The center portions 44a, 46a are parts of the first inclined lug groove 44 and the second inclined lug groove 46 and extend outward from the center main groove 42 in the tire lateral direction smoothly, specifically, in linear or curved shapes. In the example illustrated in FIG. 2, the center portions 44a, 46a extend in a straight line.

The outer portions 44b, 46b are parts of the first inclined lug groove 44 and the second inclined lug groove 46 and extend inward from a shoulder side of the tread portion in the tire lateral direction in smooth shapes, specifically, linear or curved shapes. Here, smooth extension of the groove means to extend like straight lines or curves with a finite curvature such that a centerline of the groove passing through the center of the groove width is not bent. As illustrated in FIG. 3, the outer portions 44b, 46b extend in linear shapes.

The bent portions 44c, 46c are parts of the first inclined lug groove 44 and the second inclined lug groove 46 and connect the center portions 44a, 46a to the outer portions 44b, 46b. The center portions 44a, 46a and the outer portions 44b, 46b are bent and connected together at the bent portions 44c, 46c. Preferably, parts of the center portions 44a, 46a connected to the bent portions 44c, 46c from the inner side in the tire lateral direction are larger in an inclination angle to the first direction than parts of the outer portions 44b, 46b extending outward from the bent portions 44c, 46c in the tire lateral direction. Preferably, a bend angle θ (see FIG. 3) between the center portions 44a, 46a and the outer portions 44b, 46b ranges from 110 to 170 degrees.

Each of the positions in the tire lateral direction of the bent portions 44c, 46c is preferably located at a distance, from the tire equator line CL, of from 8 to 23% of a length that is half the tire ground contact width and more preferably at a distance, from the tire equator line CL, of from 12 to 19% of the length that is half the tire ground contact width.

Each one of the inner branched lug grooves 48 is branched from the middle of a corresponding one of the first inclined lug grooves 44 and the second inclined lug grooves 46, extends inward in the tire lateral direction, and connects to the center main groove 42. The inner branched lug groove 48 extends inward in the tire lateral direction while being inclined in an inclination direction identical to an inclination direction of the first inclined lug groove 44 or the second inclined lug groove 46 with respect to the tire circumferential direction and the tire lateral direction. In other words, the inner branched lug groove 48 is inclined to extend in the second direction while extending inward in the tire lateral direction.

A plurality of the inner branched lug grooves 48 are provided at intervals in the tire circumferential direction for the respective first inclined lug grooves 44 and the respective second inclined lug grooves 46 to form an inner inclined lug groove group.

Preferably, each one of the inner branched lug grooves 48 is provided substantially parallel with the center portions 44a, 46a. "Substantially parallel" refers to an angular difference between the centerlines of two grooves being 10 degrees or less and preferably 8 degrees or less. Additionally, preferably, the inner branched lug groove 48 is smaller in inclination angle to the tire lateral direction than the center portions 44a, 46a. In this case, preferably, the angular difference between the centerlines of the two grooves is 10 degrees or less and preferably 8 degrees or less.

Additionally, preferably, the inner branched lug groove 48 is branched from the outer portions 44b, 46b. Preferably, a position in the tire lateral direction where the inner branched lug groove 48 is branched from the outer portions 44b, 46b is located at a distance, from the tire equator line CL, of from 15 to 35% of the length that is half the tire ground contact width.

The center portions 44a, 46a and the inner branched lug groove 48 are alternately provided in the tire circumferential direction as lug grooves connecting the outer portions 44b, 46b to the center main groove 42.

Each one of the bent lug grooves 50 is a groove extending outward from the bent portions 44c, 46c of the first inclined lug groove 44 and the second inclined lug groove 46, respectively, in the tire lateral direction and also extending in the second direction. The bent lug groove 50 is provided in association with each one of the first inclined lug grooves 44 and the second inclined lug grooves 46.

The bent lug groove 50 further extends while intersecting with an adjacent first inclined lug groove 44 or an adjacent second inclined lug groove 46 adjacent to the first inclined lug groove 44 or the second inclined lug groove 46 in the second direction. The bent lug groove 50 is closed within a region of a block land portion without reaching a first inclined lug groove 44 or a second inclined lug groove 46 adjacent to the adjacent inclined lug groove 44 or the adjacent inclined lug groove 46 in the second direction.

Each one of the outer branched lug grooves 52 is a groove extending outward from the outer portions 44b, 46b of the first inclined lug groove 44 and the second inclined lug groove 46, respectively, in the tire lateral direction and also extending in the second direction. Branch positions where the outer branched lug groove 52 is branched from the first inclined lug groove 44 and the second inclined lug groove 46 are located substantially opposite, across the outer portions 44b, 46b, to the branch positions where the inner branched lug groove 48 is branched from the first inclined lug groove 44 and the second inclined lug groove 46. Additionally, the branch positions where the outer branched lug groove 52 is branched from the first inclined lug groove 44 and the second inclined lug groove 46 are located on a first direction side of the positions of the bent portions 44c, 46c of the same first inclined lug groove 44 and second inclined lug groove 46.

The outer branched lug groove 52 further extends while intersecting with an adjacent first inclined lug groove 44 or an adjacent second inclined lug groove 46 respectively adjacent to the first inclined lug groove 44 and the second inclined lug groove 46 in the second direction, and connects to a first inclined lug groove 44 or a second inclined lug groove 46 adjacent to the adjacent first inclined lug groove 44 or the adjacent second inclined lug groove 46 in the second direction. In other words, the outer branched lug groove 52 is connected to the second, first inclined lug groove 44 or the second, second inclined lug groove 46 from this outer branched lug groove 52 as viewed in the second direction of the tire circumferential direction. Accordingly, one first inclined lug groove 44 or second inclined lug groove 46 includes a branch position where one outer branched lug groove 52 is branched from the inclined lug groove and a traversing position where one outer branched lug groove 52 traverses the inclined lug groove. The branch position is located inward of the traversing position in the tire lateral direction.

Preferably, the branch positions where the outer branched lug groove 52 is branched from the outer portions 44b, 46b and extends in the second direction are located, in regard to the tire lateral direction, at a distance, from the tire equator line CL, of from 15 to 35% of the length that is half the tire ground contact width.

Moreover, the tread pattern 40 is provided with a notch groove 54 between two first inclined lug grooves 44 adjacent to each other in the tire lateral direction and between two second inclined lug grooves 46 adjacent to each other in the tire lateral direction in a region between two outer branched lug grooves 52 connecting the two first inclined lug grooves 44 or second inclined lug grooves 46 together, the notch groove 54 being closed within the region of a corresponding block land portion. Moreover, a notch groove 56 closed within the region of a corresponding block land portion is provided outward of the above-described region in the tire lateral direction. The notch grooves 54, 56 extend from groove walls, in the second direction, of the first inclined lug groove 44 and the second inclined lug groove 46.

The inclination directions in which the bent lug groove 50, the outer branched lug groove 52, and the notch grooves 54, 56 are inclined with respect to the tire lateral direction, extend in the second direction of the tire circumferential direction while extending outward in the tire lateral direction. The inclination directions differ from the inclination directions of the first inclined lug groove 44, the second inclined lug groove 46, and the inner branched lug groove 48. Preferably, the inclination directions of the bent lug groove 50, the outer branched lug groove 52, and the notch grooves 54, 56 are substantially parallel with one another. "Substantially parallel" refers to an angular difference between the centerlines of two grooves being 10 degrees or less and preferably 8 degrees or less. Preferably, the inclination directions of the bent lug groove 50, the outer branched lug groove 52, and the notch grooves 54, 56 are from 10 to 60 degrees to the tire lateral direction.

Preferably, the inclination angles of the first inclined lug groove 44 and the second inclined lug groove 46 to the first direction are from 20 to 60 degrees in a region located inward in the tire lateral direction of the traversing position where the outer branched lug groove 52 traverses the inclined lug groove. For improved drainage properties, setting the inclination angles to from 30 to 80 degrees is preferable for a region located outward of the traversing position in the tire lateral direction.

Such grooves define a plurality of block land portions between the first inclined lug grooves 44 adjacent to each other in the tire circumferential direction and between the second inclined lug grooves 46 adjacent to each other in the tire circumferential direction. Here, the block land portions between the first inclined lug grooves 44 adjacent to each other in the tire circumferential direction and between the second inclined lug grooves 46 adjacent to each other in the tire circumferential direction include block land portions located inward in the tire lateral direction of one of the two outer branched lug grooves 52 that is located inward of the other in the tire lateral direction. Among these block land portions, an inner block land portion 64 located at an innermost position in the tire lateral direction in contact with center main groove 42 preferably has a smaller ground contact area than an outer block land portion 62 located at an outermost position in the tire lateral direction. In this case, preferably, a ratio of the ground contact area of the inner block land portion 64 to the ground contact area of the outer block land portion 62 is from 15% to 35%. In this way, edge components of the block land portions concentrate at the periphery of the tire equator line CL. This allows improvement of traction performance on snow-covered road surfaces.

Sipes 70, 72 are provided in the respective block land portions provided between the first inclined lug grooves 44 adjacent to each other in the tire circumferential direction and between the second inclined lug grooves 46 adjacent to each other in the tire circumferential direction. One end of each of the sipes 70, 72 opens to the first inclined lug groove 44 or the second inclined lug groove 46, and the other end opens to the center main groove 42, the adjacent first inclined lug groove 44, 46, or the notch groove 54.

The inclination direction of the sipes 70 provided in the regions of block land portions on the first side is the same as the first direction along the inward direction in the tire lateral direction, in other words, the inclination direction of the bent lug groove 50, the outer branched lug groove 52, and the notch grooves 54, 56 on the first side are the same. Preferably, each of the sipes 70 is provided substantially parallel with the bent lug groove 50, the outer branched lug groove 52, and the notch grooves 54, 56 on the first side. "Substantially parallel" refers to an angular difference between the centerline of the sipe and the centerline of the groove being 10 degrees or less and preferably 8 degrees or less. The inclination direction of the sipe refers to the inclination direction of a straight line connecting a start point to an end point of the sipe.

The inclination direction of the sipes 72 provided in the regions of block land portions on the second side is the same as the first direction along the inward direction in the tire lateral direction, in other words, as the inclination direction of the bent lug groove 50, the outer branched lug groove 52, and the notch grooves 54, 56 on the second side. Preferably, each of the sipes 72 is provided substantially parallel with the bent lug groove 50, the outer branched lug groove 52, and the notch grooves 54, 56 on the second side. "Substantially parallel" refers to an angular difference between the centerline of the sipe and the centerline of the groove being 10 degrees or less and preferably 8 degrees or less.

Moreover, in a region located outward of the second outer branched lug groove 52 as viewed from the inner side in the tire lateral direction in the tread pattern 40, block land portions are provided that are each enclosed by the pattern end, the two first inclined lug grooves 44 or second inclined lug grooves 46 adjacent to each other in the tire circumferential direction, and the outer branched lug groove 52. In each of these block land portions, sipes 74, 76 that open to the outer branched lug groove 52 are provided. Each of the sipes 74 is provided on the first side. The inclination direction of the sipe 74 is the same as the second direction along the inward direction in the tire lateral direction, in other words, as the inclination direction of the first inclined lug groove 44. Each of the sipes 76 is provided on the second side. The inclination direction of the sipe 76 is the same as the second direction along the inward direction in the tire lateral direction, in other words, as the inclination direction of the second inclined lug groove 46.

As described above, in the present embodiment, the center portions 44a, 46a of the first inclined lug groove 44 and the second inclined lug groove 46 and the inner branched lug groove 48 are inclined in the same inclination direction as that of the outer portions 44b, 46b with respect to the tire lateral direction, in other words, inclined, with respect to the tire lateral direction, to extend in the second direction of the tire circumferential direction while extending inward in the tire lateral direction. Accordingly, the tire 10 of the present embodiment is able to provide improved wet performance including the drainage properties while at least maintaining snow performance and dry performance. The first inclined lug groove 44 and the second inclined lug groove 46 are provided with the bent portions 44c, 46c. This allows snow entering the first inclined lug groove 44 and the second inclined lug groove 46 to be compacted to generate a strong snow column shear force, improving the snow performance.

The inner branched lug groove 48 is branched from the outer portion 44b to allow enlargement of the block land portion enclosed by the inner branched lug groove 48 and the first inclined lug groove 44 or the second inclined lug groove 46 in the tire circumferential direction. This allows dry performance to be improved.

The positions in the tire lateral direction of the bent portions 44c, 46c are set at a distance, from the tire equator line CL, of from 8 to 23% of the length that is half the tire ground contact width of the tread pattern 40, in other words, the bent portions 44c, 46c are each provided in a region in the vicinity of the tire equator line CL. Thus, during traveling on snow-covered road surfaces, the center region of the tread portion causes snow entering the first inclined lug groove 44 and the second inclined lug groove 46 to be compacted to generate a strong snow column shear force, improving the snow performance. For traction of the tire, the center region contributes significantly to the traction and thus allows particularly the traction, included in the snow performance, to be improved.

For such grooves, preferably, the center portions 44a, 46a are smaller in groove depth than the outer portions 44b, 46b. This enables an increase in block rigidity of the block land portions in contact with the center main groove 42, thus allowing improvement of the dry performance, particularly initial steering responsiveness. The center portions 44a, 46a are, for example, from 3 to 5 mm in groove depth. The outer portions 44b, 46b are from 6 to 9 mm in groove depth.

Preferably, the inner branched lug groove 48 is smaller in groove depth than the outer portions 44b, 46b. This enables an increase in block rigidity of the block land portions in contact with the center main groove 42, thus allowing improvement of the dry performance, particularly the initial steering responsiveness. The inner branched lug groove 48 is, for example, from 3 to 5 mm in groove depth.

The tread pattern 40 is provided with the bent lug grooves 50, in other words, the bent lug groove 50 is provided to further extend while intersecting with the adjacent first inclined lug groove 44 or the adjacent second inclined lug groove 46 adjacent to the first inclined lug groove 44 or the second inclined lug groove 46 in the second direction. This allows drainage performance to be improved, and also forms block land portions to increase the number of edge components, thus allowing the snow performance to be improved.

Preferably, the bent lug groove 50 is smaller in groove depth than the outer portions 44b, 46b. This enables the block rigidity of the block land portions to be adjusted, allowing the dry performance to be improved.

The tread pattern 40 is provided with the outer branched lug grooves 52. This allows the drainage performance to be improved, and also forms block land portions to increase the number of edge components, thus allowing the snow performance to be improved.

Preferably, the outer branched lug groove 52 is smaller in groove depth than the outer portions 44b, 46b. This enables the block rigidity of the block land portions to be adjusted, allowing the dry performance to be improved. The outer branched lug groove 52 is, for example, from 3 to 7 mm in groove depth.

The bent lug groove 50 includes a portion (hereinafter referred to as a portion A) extending in the second direction from a point where the bent lug groove 50 intersects with the adjacent first inclined lug groove 44 or the adjacent second inclined lug groove 46 adjacent to the bent lug groove 50 in the second direction. The bent lug groove 50 also includes a portion (hereinafter referred to as a portion B) extending from the bent portions 44c, 46c to the point where the bent lug groove 50 intersects with the adjacent first inclined lug groove 44 or the adjacent second inclined lug groove 46. The portion A is preferably larger in groove depth than the portion B. This enables the block rigidity of the block land portions to be adjusted, allowing the dry performance to be improved. The portion A is, for example, 4 to 7 mm in groove depth. The portion B is, for example, from 3 to 6 mm in groove depth.

Preferably, the position, in the tire circumferential direction, of a connection point A1 (see FIG. 3) between the center main groove 42 and the inner branched lug groove 48 provided for each one of the first inclined lug grooves 44 is located between a connection point B1 (see FIG. 3) between each one of the first inclined lug grooves 44 and the center main groove and a connection point C1 (see FIG. 3) between the center main groove 42 and the first inclined lug groove 44 adjacent to each one of the first inclined lug grooves 44 in the first direction. The position, in the tire circumferential direction, of a connection point A2 (see FIG. 3) between the center main groove 42 and the inner branched lug groove 48 provided for each one of the second inclined lug grooves 46 is located between a connection point B2 (see FIG. 3) between each one of the second inclined lug grooves 46 and the center main groove 42 and a connection point C2 (see FIG. 3) between the center main groove 42 and the second inclined lug groove 46 adjacent to each one of the second inclined lug grooves 46 in the first direction. This enables the block rigidity of the block land portions to be adjusted, allowing the dry performance to be improved.

In this case, the distance between the connection point A1 and the connection point B1 in the tire circumferential direction is preferably from 20 to 55% and more preferably from 25 to 50% of the distance between the connection point B1 and the connection point C1 in the tire circumferential direction. Additionally, the distance between the connection point A2 and the connection point B2 in the tire circumferential direction is preferably from 20 to 55% and more preferably from 25 to 50% of the distance between the connection point B2 and the connection point C2 in the tire circumferential direction. Additionally, preferably, the position of the connection point A1 in the tire circumferential direction is closer to the position of the connection point B2 or the connection point C2 in the tire circumferential direction than to the position of the connection point A2 in the tire circumferential direction. In this way, different shapes can be provided for blocks located opposite to each other across the center main groove 42 at the same position in the tire circumferential direction. This allows suppression of a fluctuation, in the tire circumferential direction, of the block rigidity of the blocks located opposite to each other across the center main groove 42, allowing the initial steering responsiveness to be stably improved.

Examples, Conventional Example, and Comparative Examples

In order to investigate the effects of the present embodiment, tires were manufactured having various tread patterns. A structure adopted for all the manufactured tires is as illustrated in FIG. 1.

The tire size of each manufactured tire was 195/65R15 91H. Each manufactured tire was mounted on a 15×6.0J rim (air pressure: 200 kPa) and mounted on a front wheel drive 1500-cc passenger vehicle.

The passenger vehicle was driven on dry road surfaces and wet road surfaces in a test course. A driver made a sensory evaluation of the dry performance and the wet performance. For the wet performance, special attention was paid to the drainage performance (anti-hydroplaning performance) for evaluation.

Additionally, the passenger vehicle was driven on snow-covered road surfaces in the test course, and a sensory evaluation of traction performance and braking performance was performed.

All evaluation results were expressed as index values, with the results of Conventional Example assigned an index value of 100. Larger index values indicate a better result.

Figure 4:
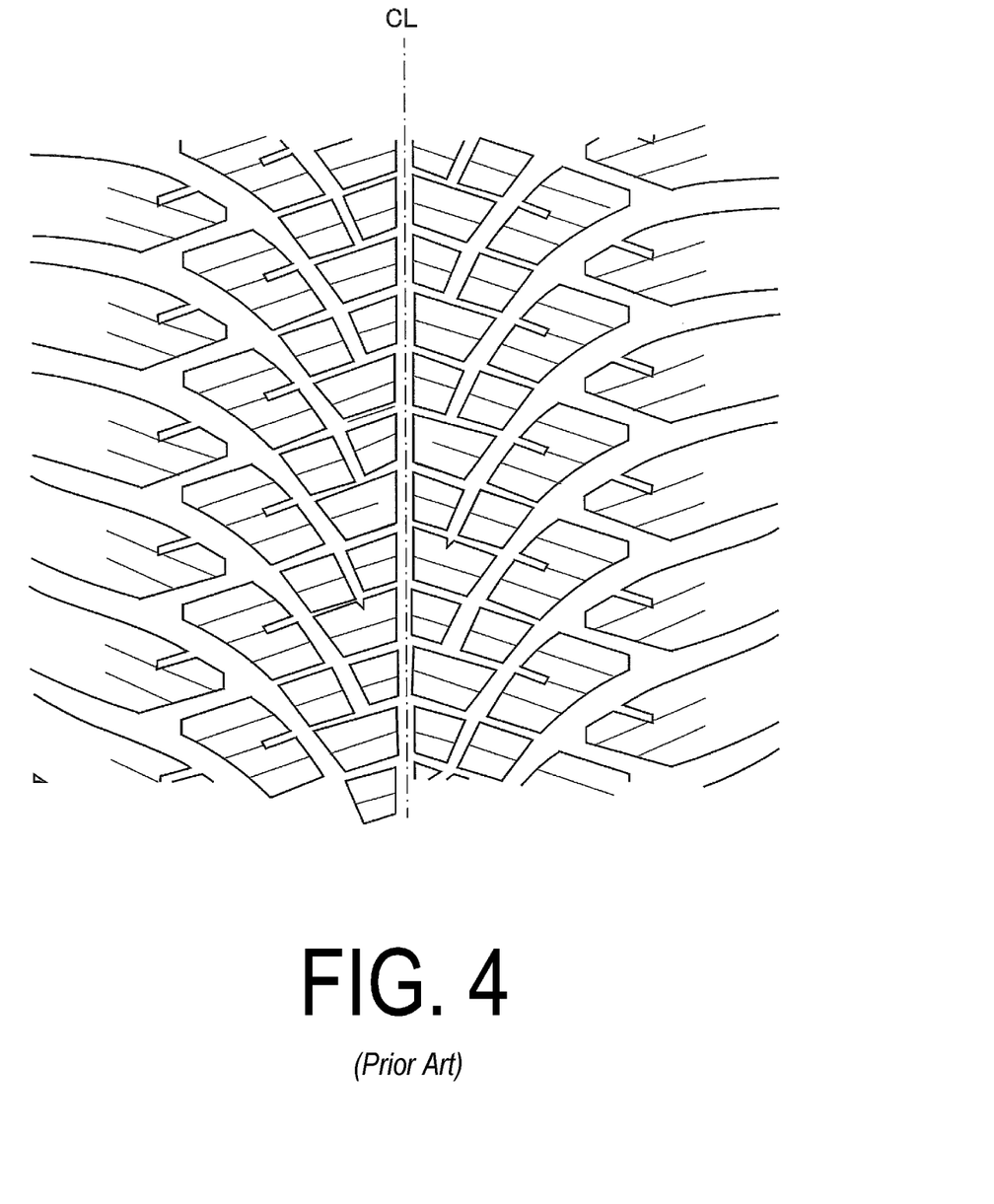
FIG. 4 is a diagram illustrating a tread pattern in the related art.

Conventional Example employed a tread pattern illustrated in FIG. 4. The tread pattern of the Conventional Example differs from the tread pattern illustrated in FIG. 2 in the inclination direction of the center portions 44a, 46a and the inner branched lug groove 48 with respect to the tire lateral direction. As illustrated in FIG. 4, the center portions 44a, 46a and the inner branched lug groove 48 differ in inclination direction with respect to the tire lateral direction from the outer portions 44b, 46b.

Figure 5:
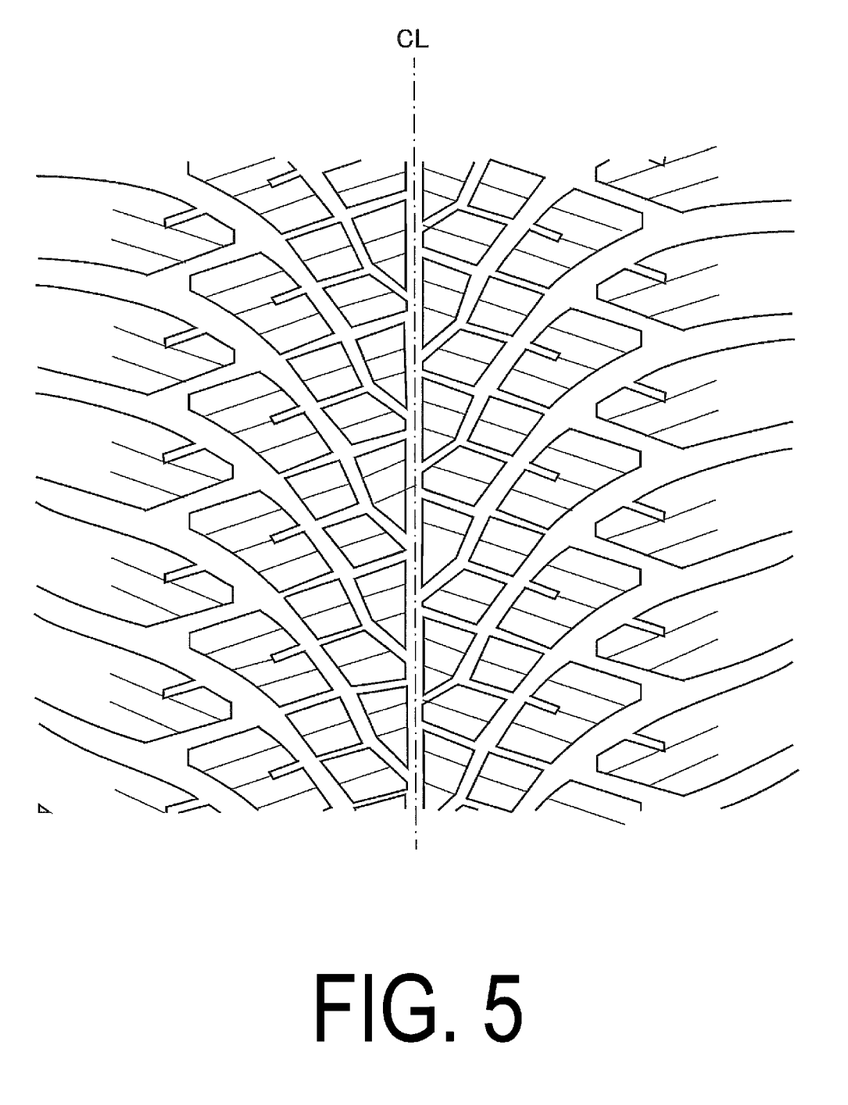
FIG. 5 is a diagram illustrating a tread pattern of Comparative Example 1.

Comparative Example 1 employed the tread pattern illustrated in FIG. 5. The tread pattern of Comparative Example 1 differs from the tread pattern illustrated in FIG. 2 in the inclination direction of the inner branched lug groove 48 with respect to the tire lateral direction. As illustrated in FIG. 5, the inner branched lug groove 48 differs in inclination direction with respect to the tire lateral direction from the outer portions 44b, 46b.

Figure 6:
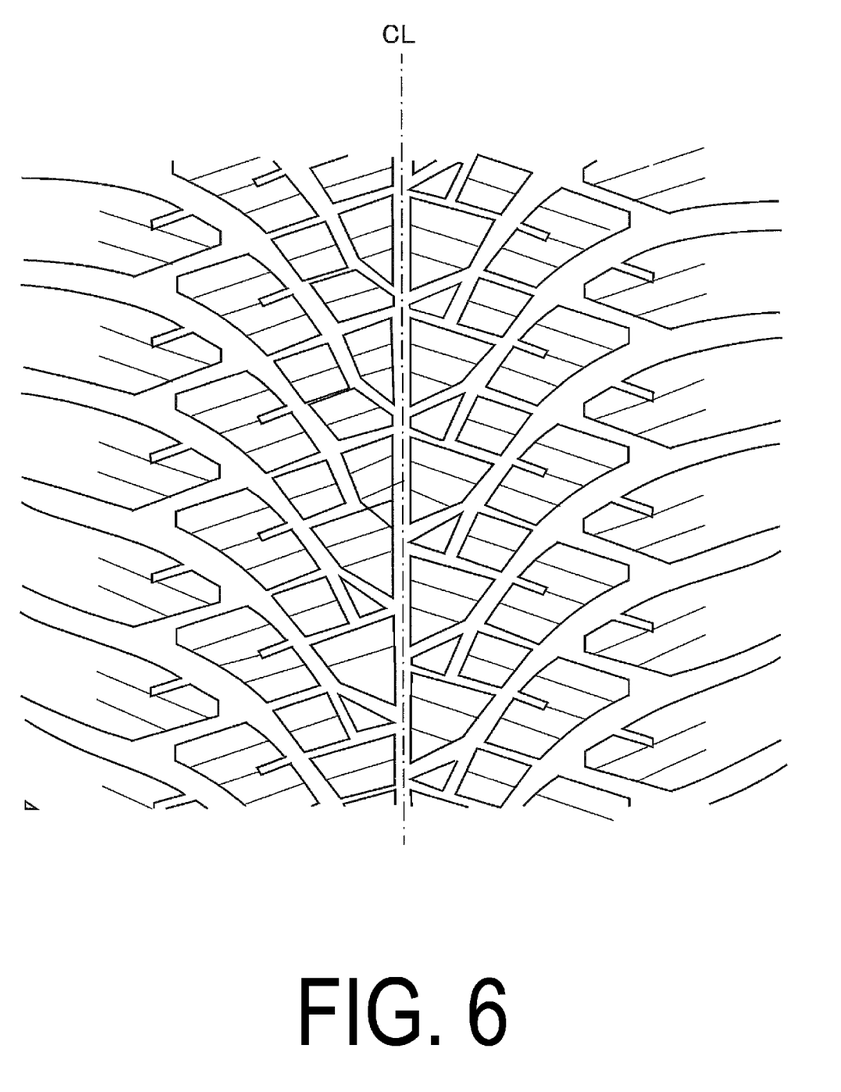
FIG. 6 is a diagram illustrating a tread pattern of Comparative Example 2.

Comparative Example 2 employed a tread pattern illustrated in FIG. 6. The tread pattern of Comparative Example 2 differs from the tread pattern illustrated in FIG. 2 in the inclination direction of the center portions 44a, 46a with respect to the tire lateral direction. As illustrated in FIG. 6, the center portions 44a, 46a differ in inclination direction with respect to the tire lateral direction from the outer portions 44b, 46b.

In all the tread patterns used in Examples 1 to 12, the center portions 44a, 46a and the inner branched lug groove 48 are the same in inclination direction with respect to the tire lateral direction as the outer portions 44b, 46b. The position of the bent portion and the branch position of the inner branched lug groove 48 were varied from the corresponding positions illustrated in FIG. 2 or the groove depths of the grooves were varied.

Tables 1 to 4, below, indicates the specifications of Examples, Comparative Examples, and Conventional Example, along with the evaluation results of the examples. In the tables, the symbol "←" in a section means that this section is the same in contents as a section to the left of this section.

In the tables, a "%" indicator in the "position of bent portion" indicates what percentage of the length that is half the tire ground contact width is the distance from the tire equator line CL to the bent portions 44c, 46c in the tire lateral direction.

In the tables, a "=" indicator in the "groove depth" means an equal groove depth, and a "<" indicator indicates a magnitude relationship of the groove depth. "A<B" indicates that A is smaller in groove depth than B. For adjustment of the groove depth, when a difference was made in groove depth, the difference in groove depth was set to 2 mm, and the groove depths of all the grooves were adjusted to make a total groove volume substantially constant.

The "portion A" in Tables 1 to 4 represents a portion of the bent lug groove 50 that further extends in the second direction from the point where the bent lug groove 50 intersects with the adjacent first inclined lug groove 44 or the adjacent second inclined lug groove 46 adjacent in the second direction. The "portion B" in Tables 1 to 4 represents a portion of the bent lug groove 50 that extends from the bent portions 44c, 46c to the point where the bent lug groove 50 intersects with the adjacent first inclined lug groove 44 or the adjacent second inclined lug groove 46.

TABLE 1

| | Conventional Example | Comparative Example 1 | Comparative Example 2 | Example 1 |
|---|---|---|---|---|
| Tread pattern diagram | FIG. 4 | FIG. 5 | FIG. 6 | FIG. 2 |
| Position of bent portion | 25% | 25% | 25% | 25% |
| Branch position of inner branched lug groove | Outer portion | ← | ← | ← |
| Groove depth (center portion, outer portion) | Center portion = outer portion | ← | ← | ← |
| Groove depth (inner branched lug groove, outer portion) | Inner branched lug groove = outer portion | ← | ← | ← |
| Groove depth (bent lug groove, outer portion) | Bent lug groove = outer portion | ← | ← | ← |
| Groove depth (outer branched lug groove, outer portion, center portion) | Outer branched lug groove = outer portion = center portion | ← | ← | ← |
| Groove depth (portion A, portion B) | Portion A = portion B | ← | ← | ← |
| Dry performance | 100 | 101 | 99 | 101 |
| Wet performance | 100 | 100 | 100 | 102 |
| Snow performance | 100 | 100 | 100 | 100 |

TABLE 2

|  | Example 2 | Example 3 | Example 4 | Example 5 |
|---|---|---|---|---|
| Tread pattern diagram | FIG. 2 | ← | ← | ← |
| Position of bent portion | 23% | 15% | 8% | 5% |
| Branch position of inner branched lug groove | Outer portion | ← | ← | ← |
| Groove depth (center portion, outer portion) | Center portion = outer portion | ← | ← | ← |
| Groove depth (inner branched lug groove, outer portion) | Inner branched lug groove = outer portion | ← | ← | ← |
| Groove depth (bent lug groove, outer portion) | Bent lug groove = outer portion | ← | ← | ← |
| Groove depth (outer branched lug groove, outer portion, center portion) | Outer branched lug groove = outer portion = center portion | ← | ← | ← |
| Groove depth (portion A, portion B) | Portion A = portion B | ← | ← | ← |
| Dry performance | 101 | 101 | 101 | 101 |
| Wet performance | 102 | 102 | 102 | 102 |
| Snow performance | 102 | 103 | 102 | 101 |

TABLE 3

|  | Example 6 | Example 7 | Example 8 | Example 9 |
|---|---|---|---|---|
| Tread pattern diagram | FIG. 2 | ← | ← | ← |
| Position of bent portion | 25% | 5% | 15% | ← |
| Branch position of inner branched lug groove | Center portion | ← | ← | ← |
| Groove depth (center portion, outer portion) | Center portion = outer portion | ← | Center portion < outer portion | ← |
| Groove depth (inner branched lug groove, outer portion) | Inner branched lug groove = outer portion | ← | ← | Inner branced lug groove < outer portion |
| Groove depth (bent lug groove, outer portion) | Bent lug groove = outer portion | ← | ← | ← |
| Groove depth (outer branched lug groove, outer portion, center portion) | Outer branched lug groove = outer portion = center portion | ← | Outer branced lug groove = outer portion > center portion | ← |
| Groove depth (portion A, portion B) | Portion A = portion B | ← | ← | ← |
| Dry performance | 100 | 100 | 102 | 103 |
| Wet performance | 101 | 101 | 102 | 102 |
| Snow performance | 100 | 100 | 103 | 103 |

TABLE 4

|  | Example 10 | Example 11 | Example 12 |
|---|---|---|---|
| Tread pattern diagram | FIG. 2 | ← | ← |
| Position of bent portion | 15% | ← | ← |
| Branch position of inner branched lug groove | Outer portion | ← | ← |
| Groove depth (center portion, outer portion) | Center portion < outer portion | ← | ← |
| Groove depth (inner branched lug groove, outer portion) | Inner branched lug groove < outer portion | Inner branched lug groove < outer portion | Inner branched lug groove < outer portion |
| Groove depth (bent lug groove, outer portion) | Bent lug groove < outer portion | ← | ← |
| Groove depth (outer branched lug groove, outer portion, center portion) | Outer branched lug groove = outer portion > center portion | Outer portion > outer branced lug groove | ← |
| Groove depth (portion A, portion B) | Portion A = portion B | ← | Portion A > portion B |

TABLE 4-continued

|  | Example 10 | Example 11 | Example 12 |
|---|---|---|---|
| Dry performance | 104 | 105 | 106 |
| Wet performance | 102 | 102 | 102 |
| Snow performance | 103 | 104 | 104 |

A comparison among Example 1, Conventional Example, and Comparative Examples 1, 2 indicates that the wet performance is improved when the center portions 44a, 46a of the first inclined lug groove 44 and the second inclined lug groove 46 and the inner branched lug groove 48 are the same in inclination direction as the outer portions 44b, 46b of the first inclined lug groove 44 and the second inclined lug groove 46.

Additionally, a comparison among Examples 2 to 5 in Table 2 indicates that the snow performance is improved when the positions in the tire lateral direction of the bent portions 44c, 46c are located at a distance, from the tire equator line CL, of from 8 to 23% of the length that is half the tire ground contact width.

A comparison among Examples 6, 7 and Examples 1, 5 in Table 3 indicates that the dry performance is improved when the inner branched lug groove 48 is branched from the outer portions 44b, 46b.

A comparison among Examples 8 to 12 in Tables 3, 4 indicates that the dry performance is improved when the groove depth of the center portion<groove depth of the outer portion, groove depth of the inner branched lug groove<groove depth of the outer portion, groove depth of the bent lug groove<groove depth of the outer portion, groove depth of the outer branched lug groove<groove depth of the outer portion, and groove depth of the portion B<groove depth of the portion A.

The foregoing has been a detailed description of the pneumatic tire according to embodiments of the present technology. However, the pneumatic tire according to an embodiment of the present technology is not limited to the above embodiments or examples, and may of course be enhanced or modified in various ways within the scope of the present technology.

The invention claimed is:

1. A pneumatic tire with a tread portion provided with a tread pattern, the pneumatic tire comprising:

a center main groove provided on a tire equator line and extending in a tire circumferential direction, a first inclined lug groove group including a plurality of first inclined lug grooves provided at intervals in the tire circumferential direction, each one of the first inclined lug grooves being provided on a first side of the center main groove in a tire lateral direction and extending, at any position in a ground contact region of the tread portion, from the center main groove in an inclination direction inclined with respect to the tire circumferential direction and the tire lateral direction while facing outward on the first side in the tire lateral direction and also facing in a first direction of the tire circumferential direction, a second inclined lug groove group including a plurality of second inclined lug grooves provided at intervals in the tire circumferential direction, each one of the second inclined lug grooves being provided on a second side of the center main groove in the tire lateral direction and extending, at any position in the ground contact region of the tread portion, from the center main groove in an inclination direction inclined with respect to the tire circumferential direction and the tire lateral direction while facing outward on the second side in the tire lateral direction and also facing in the first direction of the tire circumferential direction, and an inner branched lug groove group including inner branched lug grooves each provided for a corresponding one of the first inclined lug grooves and the second inclined lug grooves, each one of the inner branched lug grooves being branched from a middle of one of the first inclined lug grooves and the second inclined lug grooves and extending inward in the tire lateral direction while being inclined, with respect to the tire circumferential direction and the tire lateral direction, in an inclination direction identical to an inclination direction of the first inclined lug grooves or the second inclined lug grooves, each one of the inner branched lug grooves being connected to the center main groove without being connected to an adjacent first inclined lug groove or an adjacent second inclined lug groove adjacent to one of the first inclined lug grooves or one of the second inclined lug grooves in the first direction, wherein each one of the first inclined lug grooves and the second inclined lug grooves includes a center portion extending outward from the center main groove in the tire lateral direction in a linear or curved shape, an outer portion extending inward from a shoulder side of the tread portion in the tire lateral direction in a linear or curved shape, and a bent portion at which the center portion and the outer portion are bent and connected together, and the center portion is smaller in groove depth than the outer portion.

2. The pneumatic tire according to claim 1, wherein each one of the inner branched lug grooves is branched from the outer portion.

3. The pneumatic tire according to claim 1, wherein each one of the inner branched lug grooves is parallel with the center portion or is smaller in inclination angle with respect to the tire lateral direction than the center portion.

4. The pneumatic tire according to claim 1, wherein a position in the tire lateral direction of the bent portion is located at a distance, from the tire equator line, of from 8 to 23% of a length that is half a tire ground contact width of the tread pattern.

5. The pneumatic tire according to claim 1, wherein inner branched lug groove group is smaller in groove depth than the outer portion.

6. The pneumatic tire according to claim 1, wherein outer branched lug grooves are each provided to extend outward from the outer portion of a corresponding one of the first inclined lug grooves and the second inclined lug grooves in the tire lateral direction and also to extend in a second direction opposite to the first direction, and each one of the outer branched lug grooves intersects with an adjacent first inclined lug groove or an adjacent second inclined lug groove adjacent to one of the first inclined lug grooves and the second inclined lug grooves in the second direction and further extends from the adjacent first inclined lug groove of the adjacent second inclined lug groove, and connects to a first inclined lug groove or a second inclined lug groove adjacent to the adjacent first inclined lug groove or the adjacent second inclined lug groove in the second direction.

7. The pneumatic tire according to claim 6, wherein each one of the outer branched lug grooves is smaller in groove depth than the outer portion.

8. The pneumatic tire according to claim 1, wherein a position in the tire circumferential direction of a connection point A1 between the center main groove and one of the inner branched lug grooves provided is located between a connection point B1 of one of the first inclined lug grooves and the center main groove and a connection point C1 of the center main groove and another first inclined lug groove adjacent to the one of the first inclined lug grooves in the first direction, and a position in the tire circumferential direction of a connection point A2 between the center main groove and the inner branched lug groove is located between a connection point B2 of one of the second inclined lug grooves and the center main groove and a connection point C2 of the center main groove and another second inclined lug groove adjacent to the one of the second inclined lug grooves in the first direction.

9. The pneumatic tire according to claim 8, wherein a distance between the connection point A1 and the connection point B1 in the tire circumferential direction is from 20 to 55% of a distance between the connection point B1 and the connection point C1 in the tire circumferential direction, and a distance between the connection point A2 and the connection point B2 in the tire circumferential direction is from 20 to 55% of a distance between the connection point B2 and the connection point C2 in the tire circumferential direction.

10. The pneumatic tire according to claim 8, wherein a position of the connection point A1 in the tire circumferential direction is closer to a position of the connection point B2 or the connection point C2 in the tire circumferential direction than to a position of the connection point A2 in the tire circumferential direction.

11. A pneumatic tire with a tread portion provided with a tread pattern, the pneumatic tire comprising:

a center main groove provided on a tire equator line and extending in a tire circumferential direction, a first inclined lug groove group including a plurality of first inclined lug grooves provided at intervals in the tire circumferential direction, each one of the first inclined lug grooves being provided on a first side of the center main groove in a tire lateral direction and extending, at any position in a ground contact region of the tread portion, from the center main groove in an inclination direction inclined with respect to the tire circumferential direction and the tire lateral direction while facing outward on the first side in the tire lateral direction and also facing in a first direction of the tire circumferential direction, a second inclined lug groove group including a plurality of second inclined lug grooves provided at intervals in the tire circumferential direction, each one of the second inclined lug grooves being provided on a second side of the center main groove in the tire lateral direction and extending, at any position in the ground contact region of the tread portion, from the center main groove in an inclination direction inclined with respect to the tire circumferential direction and the tire lateral direction while facing outward on the second side in the tire lateral direction and also facing in the first direction of the tire circumferential direction, and an inner branched lug groove group including inner branched lug grooves each provided for a corresponding one of the first inclined lug grooves and the second inclined lug grooves, each one of the inner branched lug grooves being branched from a middle of one of the first inclined lug grooves and the second inclined lug grooves and extending inward in the tire lateral direction while being inclined, with respect to the tire circumferential direction and the tire lateral direction, in an inclination direction identical to an inclination direction of the first inclined lug grooves or the second inclined lug grooves, each one of the inner branched lug grooves being connected to the center main groove, wherein each one of the first inclined lug grooves and the second inclined lug grooves includes a center portion extending outward from the center main groove in the tire lateral direction in a linear or curved shape, an outer portion extending inward from a shoulder side of the tread portion in the tire lateral direction in a linear or curved shape, and a bent portion at which the center portion and the outer portion are bent and connected together, and bent lug grooves are provided for the respective first inclined lug grooves and the respective second inclined lug grooves, each one of the bent lug grooves extending outward from the bent portion of a corresponding one of the first inclined lug grooves and the second inclined lug grooves in the tire lateral direction and also extending in a second direction opposite to the first direction.

12. The pneumatic tire according to claim 11, wherein each of the bent lug grooves provided for the respective first inclined lug grooves and the respective second inclined lug grooves further extends while intersecting with an adjacent first inclined lug groove or an adjacent second inclined lug groove adjacent to one of the first inclined lug grooves or one of the second inclined lug grooves in the second direction opposite to the first direction.

13. The pneumatic tire according to claim 12, wherein a portion of each one of the bent lug grooves extending in the second direction from a point where each one of the bent lug grooves intersects with the adjacent first inclined lug groove or the adjacent second inclined lug groove is larger in groove depth than a portion of each one of the bent lug grooves extending from the bent portion to the point where each one of the bent lug grooves intersects with the adjacent first inclined lug groove or the adjacent second inclined lug groove.

14. The pneumatic tire according to claim 11, wherein each one of the bent lug grooves is smaller in groove depth than the outer portion.

* * * * *